United States Patent
Hartmann et al.

(10) Patent No.: US 9,296,495 B2
(45) Date of Patent: Mar. 29, 2016

(54) ATTITUDE AND ORBIT CONTROL SYSTEM AND METHOD FOR OPERATING SAME

(71) Applicant: Jena Optronik GmbH, Jena (DE)

(72) Inventors: Rolf Hartmann, Jena (DE); Dieter Schoedlbauer, Munich (DE); Uwe Schmidt, Buergel (DE)

(73) Assignee: JENA OPTRONIK GMBH, Jena (DE)

( * ) Notice: Subject to any disclaimer, the term of this patent is extended or adjusted under 35 U.S.C. 154(b) by 61 days.

(21) Appl. No.: 14/454,162

(22) Filed: Aug. 7, 2014

(65) Prior Publication Data
US 2015/0041595 A1 Feb. 12, 2015

(30) Foreign Application Priority Data

Aug. 12, 2013 (DE) .......................... 10 2013 108 711

(51) Int. Cl.
| | |
|---|---|
| *B64G 1/36* | (2006.01) |
| *B64G 1/10* | (2006.01) |
| *B64G 1/24* | (2006.01) |
| *B64G 1/28* | (2006.01) |
| *G01C 21/02* | (2006.01) |

(52) U.S. Cl.
CPC *B64G 1/361* (2013.01); *B64G 1/10* (2013.01); *B64G 1/242* (2013.01); *B64G 1/288* (2013.01); *B64G 1/36* (2013.01); *G01C 21/025* (2013.01)

(58) Field of Classification Search
CPC .......... B64G 1/361; B64G 1/10; B64G 1/242; B64G 1/288; B64G 1/36; G01C 21/025
USPC .................................. 244/158.8, 158.4, 158.6
See application file for complete search history.

(56) References Cited

U.S. PATENT DOCUMENTS

| | | | |
|---|---|---|---|
| 5,951,609 A * | 9/1999 | Hanson ..................... | B64G 1/24 244/158.8 |
| 6,108,594 A | 8/2000 | Didinsky et al. | |
| 6,285,927 B1 | 9/2001 | Li et al. | |
| 6,347,262 B1 * | 2/2002 | Smay ..................... | B64G 1/281 244/164 |
| 6,441,776 B1 * | 8/2002 | Hein ....................... | B64G 1/24 244/164 |
| 6,732,977 B1 | 5/2004 | Goodzeit et al. | |

(Continued)

OTHER PUBLICATIONS

"Optimal Estimation for the Satellite Attitude using Star Tracker Measurements", James Ting-Ho Lo, 1978.

(Continued)

*Primary Examiner* — Justin Benedik
(74) *Attorney, Agent, or Firm* — Davidson, Davidson & Kappel, LLC

(57) ABSTRACT

A hybrid network of kinematic sensors of an AOCS, made up of a star sensor including an optical camera head, and a processing unit provided as the central master processing unit, and additional kinematic sensors, each made up of a sensor element and a processing unit connected to the central processing unit via a first bus. An additional processing unit is equivalent to the processing unit and is a redundant central processing unit. The central processing units and—are connected via an additional bus of a spacecraft provided with the hybrid network with the aid of a central computer. The particular active central processing units-provide all kinematic sensors with a uniform time pulse via a synchronization line, and supply the central computer with hybridized kinematic measuring data formed according to a method for hybridization based on the synchronous kinematic measuring data of the star sensor and the measuring data of the other sensors.

14 Claims, 11 Drawing Sheets

(56) References Cited

U.S. PATENT DOCUMENTS

| | | | |
|---|---|---|---|
| 7,062,363 B2 | 6/2006 | Needelman et al. | |
| 7,216,036 B2 | 5/2007 | Brady et al. | |
| 7,922,124 B2 * | 4/2011 | Soldi | B64G 1/242 244/158.8 |
| 8,056,863 B2 | 11/2011 | Wang et al. | |
| 8,262,028 B2 * | 9/2012 | El Mabsout | B64G 1/242 244/158.5 |
| 8,886,484 B2 * | 11/2014 | Pillukat | G01C 11/025 348/143 |
| 2003/0009248 A1 | 1/2003 | Wiser et al. | |

OTHER PUBLICATIONS

"GOES-N Data Book: 11. Attitude Control", Boeing, Feb. 2005.

"Nonlinear attitude filtering methods", F. L. Markley et al, J, AIAA 2005.

"Unscented kalman filtering for spacecraft attitude state and parameter estimation" M. C. VanDyke, J. L. Schwartz, and C. D. Hall, in Proceedings, No. AAS-0115, 2004.

Gyro Stellar Attitude Determination, Mehdi Ghezal et al., Proceedings of the 6 International ESA Conference on Guidance, Navigation and Control Systems, Loutraki, Greece, Oct. 17-20, 2005.

"Noise Estimation for Star Tracker Calibration and Enhanced Precision Attitude Determination", Quang Lam, Craig Woodruff, and Sanford Ashton, David Martin, in ISF 2002.

"Precision Attitude Determination Using a Multiple Model Adaptive Estimation Scheme", Quang M. Lam, John L. Crassidis, in IEEE AC 2007.

"Multiple Model Adaptive Estimation of Satellite Attitude using MEMS Gyros", Hoday Stearns, Masayoshi Tomizuka, American Control Conference, 2011.

\* cited by examiner

ATTITUDE AND ORBIT CONTROL SYSTEM AND METHOD FOR OPERATING SAME

This claims the benefit of German Patent Application DE 10 2013 108 711.6, filed Aug. 12, 2013 and hereby incorporated by reference herein.

The present invention relates to an attitude and orbit control system of spacecraft, in particular the detection of kinematic measured values by multiple sensors, and a method for joint processing of the kinematic measured values.

BACKGROUND

A generic attitude and orbit control system (AOCS) of spacecraft, for example satellites, is made up of kinematic AOCS sensors, software for determining the kinematic state (attitude and orbit determination (AOD)), software for targeted control of the state (attitude and orbit control (AOC)), and a number of AOCS actuators for implementing the control instructions.

Traditionally, the hardware for these AOCS elements is connected to a central computer of the aircraft, such as a satellite computer, on which the AOD and AOC software runs. Such a typical AOCS configuration is described in US 2003/009248 A1. The satellite computer uses the kinematic and dynamic state equations in order to control the satellite according to a given control law, using models of the sensors and actuators.

The rotational position, the rotational speed (also referred to as rotation rate), the rotational acceleration, as well as the corresponding translatory variables location, speed, and acceleration are used as kinematic variables. In addition, the parameters torque, moment of inertia, force, and mass are used in the dynamic equations.

AOCS sensors which are used are star sensors, solar sensors, earth sensors and magnetometers for the rotational position, gyroscopes for the rotation rate, global navigation satellite system (GNSS) sensors for the location, and acceleration sensors. In interferometric evaluation, GNSS sensors may likewise be used for detecting the rotational position with less accuracy.

The synergistic evaluation of the measured values from various kinematic AOCS sensors for data processing in attitude and orbit control systems is known from "Optimal Estimation for the Satellite Attitude Using Star Tracker Measurements," James Ting-Ho Lo, 1978. For example, the data of three to six gyroscopes and two star sensors are used for joint position estimation. In the process, all measuring data are combined into a single data stream. Data buses, primarily according to the MIL 1553 standard, have become prevalent for distributing the data streams between multiple device units of the satellite. Thus, GEOS satellites (see "GEOS-N Data Book: 11. Attitude Control," Boeing, February 2005) include a data bus according to MIL 1553, via which multiple star sensors and gyroscopes are connected to the electronics box of the attitude control system.

Initially, approaches were used having centralized evaluation of the AOCS sensor data in the satellite computer. This was essential and appropriate, since the low performance level of the sensors resulted in usable results only when multiple sensors, having a low data rate, were evaluated jointly. Examples of approaches to the problem of an insufficient number of stars detectable using a star sensor are described in U.S. Pat. No. 6,108,594 A and US 2003/0009284 A1, for example, in which centralized evaluation of the data of two star sensors in the satellite computer is necessary.

With the advent of small, powerful digital signal processors (DSP) and application-specific integrated circuit (ASIC) processing units, this resulted in the transition to decentralized processing in the sensors themselves.

At the present time, a reverse trend away from decentralization has begun. The reason lies in the fact that autonomous processing is not economically or energetically efficient, since recent processing units are overdimensioned with respect to their power for an individual sensor. In addition, in decentralized systems the opportunity is lost for synergies which are utilizable via the joint evaluation of complementary sensors.

Thus far, two trends have been observed in the decline in autonomous sensors: first, the return to centralized evaluation in the satellite computer, and second, the move toward integration of multiple types of sensors into a single hybrid sensor.

A prominent example of the first trend toward centralization is the transition from autonomous star sensors to star sensor heads, which are made up solely of a star camera and which do not have their own processing unit. The evaluation of the star data once again takes place in the satellite computer, using the star sensor software which is ported therein. However, this development has not been without problems. The star sensor is the most complex AOCS sensor, and the manufacturers' knowledge base which has been developed over decades is not easily transferable to the satellite manufacturers via software porting. In addition, the AOCS satellite bus, which is customarily used for connecting the satellite computer to the other AOCS elements, is overloaded by the quantity of unprocessed star sensor data. This is presently avoided by the additional use of point-to-point data connections in addition to the AOCS satellite bus. However, this entails increased mass and susceptibility to malfunction.

In U.S. Pat. No. 7,216,036 B2, the integration of the star sensor and the rotation rate gyroscope into a single device is used as a solution to the mentioned problems of centralization. According to the cited invention, the star camera data and gyroscope data are conducted in an internal, synchronously integrated data stream to the processing unit of the device (flight computer), where they are jointly processed and compressed. This once again allows data transmission over the standard AOCS bus of the satellite. However, the completely joint processing of gyroscope data and star sensor data does not solve the problem of integrating the knowledge base for gyroscopes and star sensors for a device manufacturer. The star sensor is used only as a secondary sensor, and its improved performance is not definitive for the system. Furthermore, there is the disadvantage that with respect to mass, volume, and heat output, the integrated device is unsuitable for an otherwise customary mounting on the sensitive primary instruments of the satellite. Thus, this approach is suitable only for small satellites having limited requirements.

The lack of control information of the AOC, which is available only in the central computer of the satellite, is considered by proponents of a return to centralized processing in the satellite computer as a process engineering drawback of decentralized approaches. The topology of the distribution and the combination of the processing units must also take into account the possibilities for subdividing the method steps.

As a counterargument to a return to centralized implementation of evaluation of measured values and satellite control in the satellite computer, other sources cite the difficulty in mastering the highly complex software necessary for this purpose.

In U.S. Pat. No. 8,056,863 B2, the aim is to reduce the complexity in the central computer by using unified measured value evaluations and control laws. A disadvantage of this approach is that only simple methods may be used, resulting in limitations for optimal control. In addition, the measured value evaluation and the satellite control must be coordinated very closely with one another. Thus, a limitation to low data rates, for example, is provided in the document U.S. Pat. No. 8,056,863 B2. This diminishes the options for an actual unification, in which approaches must be applicable to a broad class of satellites.

Practically all AOD methods are based on statistically optimized estimation methods. Depending on the complexity of the statistical model used, the methods are subdivided into least square root (LSR) methods, methods based on the maximum likelihood (ML) principle, and Bayesian methods. The statistical model describes the detection of the kinematic AOCS measuring data and the behavior of the satellite as two statistical Markov processes. Those parameters to be estimated for which the observed measured values appear to be most likely are assumed to be optimal. Since only the parameters involved in the measuring process may be directly observed, whereas the system behavior is indirectly derived, such a model is also referred to as a hidden Markov process model.

In the LSR method, statistical parameters are not known for either of the two processes, and all errors to be minimized are entered with the same weight into the optimization. If different error variances are known, for example for the three components of the position to be determined, the corresponding errors are weighted with the inverse variance in the optimization. This results in maximization of the likelihood. If the statistical parameters are not modeled as constant, but instead are themselves a static function of other parameters, the Bayesian estimator is optimal. Thus, the parameter dependencies must be regarded as probabilities which are known a priori, or additional models of the relationship between the parameters and the measured values must be introduced.

Since the parameter dependencies are usually unknown or difficult to estimate, in practice only LSR and ML methods, but not Bayesian estimators, are used in the AOCS.

The AOD and AOC processes run cyclically in the satellite, which suggests an implementation of the estimation methods as recursive filters, so-called Kalman filters (KF). The instantaneous optimal estimation is determined from the measured values of the present cycle and from the prediction made in the preceding cycle. Simply stated, an optimal time-variable compromise is found between measurement and prediction.

The KF methods have proven to be practical in many satellite missions, although some disadvantages are also known. The article "Nonlinear attitude filtering methods," F. L. Markley et al., J. AIAA 2005, provides an overview of approaches to overcoming these disadvantages. The process equations for the kinematic and dynamic parameters of the satellite control are not linear. The Kalman filter presumes linearity. For this reason, the extended Kalman filter (EKF) has been developed, in which the nonlinear equations are linearly approximated. In addition to improvements, the EKF has resulted in new drawbacks with regard to convergence and stability. As a countermeasure, the unscented Kalman filter (UKF) was developed (see, for example, the publication "Unscented Kalman filtering for spacecraft attitude state and parameter estimation," M. C. VanDyke, J. L. Schwartz, and C. D. Hall, in Proceedings, No. AAS-0115, 2004), in which the process equations are applied without linearization. The equations are applied to a quantity of supporting points of the statistical parameters randomly selected according to the Monte Carlo principle. For this purpose, the statistical distribution for these parameters must be known. A Gaussian distribution is usually assumed. The much larger quantity of data to be processed is disadvantageous. If the statistical distribution functions are unknown, which frequently is the case for AOCS applications, many more supporting points of the Monte Carlo method must be used in the so-called particle filter. This virtually completely eliminates the practical application of particle filters in the AOCS.

One alternative method for improving the KF methods is to combine them with so-called batch estimators. Not only are the measured and predictive values of the present cycle used, but also an entire "batch" of cycles is entered into the processing. The known batch methods result in smoothing of the results of the KF methods, and are carried out subsequent to same. Such smoothing of the KF result over multiple cycles is described in the article "Gyro Stellar Attitude Determination," Mehdi Ghezal et al., Proceedings of the 6th International ESA Conference on Guidance, Navigation and Control Systems, Loutraki, Greece, Oct. 17-20, 2005.

The joint filtering of measured position values of the star sensor and measured rate values of the gyroscope sensor represents a particular challenge. As the most important measuring equipment, these two sensors form the core of the AOD system. The two types of sensors have greatly different properties, which potentially may be used for mutual assistance, but this also entails certain difficulties in the hybridization of their data. Gyroscope sensors have less noise, which allows a more accurate, but only relative, position measurement over short time periods. The drift and the scaling factor error, which become dominant over longer time periods, are problematic with gyroscope sensors. Star sensors have slightly more noise, and over fairly short time periods may be disabled by glare. However, they always provide an absolute position measurement, and do not drift. The above-cited article summarizes the results of the strategy of the synergistic fusion of data of the star sensor and the gyroscope. The article concludes that up until now, the parameter selection must be very specific to the particular mission. In practice, this is very difficult and involves a high level of additional complexity. In addition to the batch smoothing mentioned above, the above-cited article provides two further possible approaches to this problem.

The first approach lies in subdividing the satellite missions or mission phases into two categories: those with short-term joint position estimation, using data from the star sensor and the gyroscope (for example, during image recording by the primary instrument of the satellite), and those with good long-term behavior (for example, geostationary satellites or mission phases having a fixed orientation with respect to the sun).

For both categories, the filtering of the star sensor data and the gyroscope measurements takes place in a single Kalman filter having a certain hybridization frequency. In the short-term category, a high hybridization frequency is selected, while the long-term category requires a low frequency. In the short-term category, the star sensor is dominant, and with its noise and in particular its low-frequency error components determines the accuracy of the position measurement. The gyroscope parameters hardly play a role, and only very brief down times of the star sensor may be bridged with gyroscope data. The gyroscope need not be of high quality, as is the case for the long-term category. In the long-term scenario, the expensive gyroscope determines the accuracy, which is sufficiently good over a long period of time. The star sensor is present only for occasional drift compensation of the gyroscope, and its low-frequency error components do not play a role.

As the second approach, the article describes an additional test filter (consider filter). Parameters which actually may not be sufficiently well observed and which therefore may not be estimated are received in the Kalman filter. In this case, the three components of the scaling factor error are used as test parameters. Normally, only the gyroscope drift is estimated in the Kalman filter. The estimations for the scaling factor are not usable in the system equations; instead, they are used only for artificial degradation of the estimated error. The aim is to prevent the covariance of the position from being unjustifiably assessed as satisfactory, and to prevent the filter from causing disorientation of the satellite due to incorrect weights.

U.S. Pat. No. 7,216,036 B2 likewise describes a method corresponding to the long-term category of the star sensor-gyroscope hybridization. In this case, the strategy is not used for expensive, highly accurate gyroscopes, but instead is used for simple gyroscopes whose accuracy is sufficient for certain small satellite missions. The star sensor is used here only to compensate for the gyroscope drift upon reaching the limit of the required measuring accuracy. The objective is to connect the star sensor as infrequently as possible in order to conserve the limited energy resources of such satellites.

U.S. Pat. No. 6,732,977 B1 describes a method which is used to solve a further problem in the hybridization of star sensor data and gyroscope data. Since the gyroscope and the star sensor are not rigidly connected to one another, but instead are generally mounted at separate locations on the satellite, the fluctuation of the relative orientation of the two sensors must be additionally balanced for the hybridization. Thermoelastic effects caused by solar radiation are the main reason for mechanical distortions of the satellite. For this reason, in geocentrically viewing satellites the misalignment periodically changes with the orbit frequency. Use is made of this effect to ascertain the misalignment between the two sensors by frequency filtering corresponding to the orbit frequency. The misalignment is additionally integrated into the Kalman filter.

The prior art described thus far uses the hybridization of data of different AOCS sensors in order to balance the particular disadvantages of various types of sensors, such as the drift with gyroscopes or the noise with star sensors, with the respective other type. The aim is not to increase the measuring accuracy beyond the limit that is achievable using individual sensors. This additional task of sensor hybridization is provided in U.S. Pat. No. 7,062,363 B2.

The position measurement in an individual star sensor is based on the comparison of measured star positions to the positions from a star catalog. The catalog positions are expressed in an inertial coordinate system. The measurement takes place in the coordinate system associated with the sensor. For the position determination, the optimal transformation of all star positions from the inertial system into the sensor system is estimated. The more stars that are available, generally approximately 16, the greater the number of optimization equations that may be used for the position comparison. The accuracy of the position measurement increases with the number of equations used. U.S. Pat. No. 7,062,363 B2 is based on an increase in the number of available equations, in that the position estimation is determined not as an optimal transformation from the inertial system into the sensor system, but, rather, as a transformation from the inertial system into the coordinate system of the satellite body. For this purpose, initially the star positions measured by one or multiple star sensors are transformed into the satellite system. In addition, the star positions are predicted in satellite coordinates with the aid of the measured values of a gyroscope rate sensor. Corresponding to the increased number of stars which are present in all available star sensors, and the stars which are predicted using the rate sensor, a higher number of optimization equations, and thus enhanced accuracy, results.

The hybridization according to the method provided in U.S. Pat. No. 7,062,363 B2 has a better effect for the fusion of the data of two star sensors than for the fusion of the star sensor data with the data of the rate sensor. Star positions determined using multiple star sensors are statistically independent measurements, so that the measuring accuracy increases with the square root of the number of stars. The star positions predicted using the rate sensor are based not only on the measurement by the rate sensor, but also on previous measurements by the star sensors. Thus, the star positions are not statistically independent, and result in a slight improvement in the accuracy.

A hybridization of position data and rate data with the objective of improving accuracy is the subject matter of the article "Noise Estimation for Star Tracker Calibration and Enhanced Precision Attitude Determination," Quang Lam, Craig Woodruff, and Sanford Ashton David Martin, in ISF 2002. In the present case, the base algorithm is the customary 6-dimensional EKF having the three position estimation errors and the three rate drift estimation errors as process parameters. Hybridization beyond that of the EKF is not provided. The aim is to achieve an improvement in accuracy by reducing the measuring errors to the component of the white noise. The measurements in the star sensor and in the gyroscope sensor also have other important correlated error components in addition to the white noise. White noise is a vital prerequisite for applicability of the EKF. Other noise components degrade the filtering result. The method described in the article "Noise Estimation for Star Tracker Calibration and Enhanced Precision Attitude Determination," Quang Lam, Craig Woodruff, and Sanford Ashton David Martin, in ISF 2002 concerns the recognition and elimination of the non-white noise components of the position sensor and the rate sensor prior to the actual filtering.

The position measuring errors of star sensors and of integrating rate sensors contain, in addition to white noise (noise equivalent angle (NEA)), correlated errors having a high frequency (HF) or a low frequency (LF). In the star sensors, the HF errors are caused by high spatial frequency error (HSFE) noise. In contrast, the LF errors are caused by low spatial frequency error (LSFE) noise. In integrating rate sensors, low-frequency error components, which are characterized by the integrated angle error (angle random walk (ARW)) and the bias instability (BI), dominate.

The method according to the article "Noise Estimation for Star Tracker Calibration and Enhanced Precision Attitude Determination," Quang Lam, Craig Woodruff, and Sanford Ashton David Martin, in ISF 2002 includes the recognition of the non-white noise components of both sensors in an identification step, and their elimination from the measured values and from the covariance matrices used in the EKF in a further, two-part deletion step. The recognition of the non-white error components is carried out independently for both types of sensors. The identification is not an integral part of the statistical estimation running in real time in the sensor data processing of the satellite. The identification takes place via complex post-processing of raw sensor data transmitted to the ground, with the aid of frequency filtering. The identification result is a numerical model (10th order polynomial) for the non-white (colored) noise components. Only this model is used in the on-board data processing.

The method described in "Noise Estimation for Star Tracker Calibration and Enhanced Precision Attitude Determination," Quang Lam, Craig Woodruff, and Sanford Ashton David Martin, in ISF 2002 has major disadvantages. One disadvantage is the assumed continuous validity of the numerical colored error models. This may not be assumed in practice, so that continual recalibrations, including the ground segment of the satellite, are necessary. In addition to the loss of validity of the model of the star sensor over time, the star sensor model used has further undesirable constraints. In the publication, there is a requirement that the star sensor is mounted on the satellite in such a way that the stars pass diagonally through the image field. This is a requirement imposed on the design of the satellite and on the mission which cannot be met in broad-scale use of the star sensor. The underlying problem with star sensors is that the measuring error is a function of spatial frequencies, corresponding to the graphical evaluation, in which, however, time frequencies are used in the subsequent filtering and control. The conversion of the spatial frequencies into time frequencies is a function of time-variable parameters, such as the rotation rate and rotational direction. Therefore, a time model of the errors of a star sensor which is valid under all conditions of use is not possible in principle.

The adaptive extended Kalman filters (AEKFs), which are based on multiple model adaptive estimation (MMAE), represent a last group of relevant modifications of the EKF method. The aim of this method derivative is improved treatment of the second hidden Markov process, which is only indirectly reflected in the measurements. The hidden Markov process of the system behavior is determined by the control commands of the AOC system. It is possible under some circumstances for these commands to be explicitly delivered from the AOC to the AOD. Thus, the control commands could be treated as known variables in the Kalman filter of the AOD. For example, the AOC may notify the AOD in advance that a maneuver having a certain rotation rate will begin at a certain point in time. Other parameters of the hidden Markov process must be treated solely statistically. For example, the EKF must respond to a defect or a clear degradation of one of the sensors in such a way that no catastrophic consequences occur for the satellite control. For this example of error resistance, the EKF would run in parallel with multiple models of errors in the sensor system. Another example for the simultaneous use of multiple models is the taking into account of fluctuations of the operating voltage. These fluctuations influence the sensor measuring errors, but are not able to detect all of them by measurement. In this case, a model bank for voltage fluctuation ranges in the Kalman filter to be assumed could be used.

In addition to the customary recursive estimation of the system parameters and their errors via the EKF, for each of the models the MMAE estimation provides the probability that the model is valid at the instantaneous point in time. The estimation, the same as the EKF, recursively uses only the instantaneous measured values.

When a priori probabilities for the occurrence of certain model variants are present, these may be included in the determination of the probability of validity of the model variants. Either the estimation of that EKF having the highest probability of validity of the model or a weighted sum may be used as the end result.

The publication "Precision Attitude Determination Using a Multiple Model Adaptive Estimation Scheme," Quang M. Lam, John L. Crassidis, in IEEE AC 2007 describes use of the MMAE technique with the aim of synergistic improvement in accuracy in the hybridization of data from multiple star sensors and an average-quality rate gyroscope for use in high-agility satellites. The objective is to achieve position accuracies which are orders of magnitude higher than the star sensor accuracy. It is shown that in mission phases having high rates, the 6-dimensional EKF traditionally used for the star sensor-gyroscope hybridization produces very large errors. The reason is the lack of accounting for the gyroscope scaling factor error and the gyroscope axis misalignment. These parameters must be taken into account at high rates. The difficulty to be overcome is that scale errors and drift errors of the gyroscope are not independent statistical variables.

Multiple model filtering is provided as a solution. Multiple EKF estimations run in parallel with different models. The models differ, on the one hand, by the dimensions of the vector of the system parameters. In addition to the mentioned six parameters, three parameters for the scaling factor error and six parameters for the gyroscope axis misalignment are introduced. Various 6-, 9-, and 15-dimensional EKF estimations are implemented in parallel. On the other hand, different models are used for different modes in which the star sensors may be present. A mode is defined, for example, by the star density in the viewing direction of the sensor, by the different rotation rates of the satellite, and by the more or less favorable orientation of the star sensor with respect to the satellite rotational axis. Probabilities which are known a priori are assumed for the modes. The weighted sum of all EKF estimations running in parallel applies as the overall estimation, the a priori probabilities of the modes and the reciprocal covariances of the differently dimensioned system models being used as weights.

Practical use of the above-described method would require considerable knowledge of various modes and their probabilities, which generally are not present. In addition, decorrelation of gyroscope drift errors and gyroscope scaling factor errors is not possible using the described approach.

The article "Multiple Model Adaptive Estimation of Satellite Attitude Using MEMS Gyros," Hoday Stearns, Masayoshi Tomizuka, American Control Conference, 2011 likewise addresses the problem of improved estimation of the position based on the data of average-quality gyroscopes with the aid of EKF estimation. The two main parameters, ARW angle noise and BI drift, may not be assumed as constant for gyroscopes of this quality; instead, new estimations must continually be made. The reason for the change in these gyroscope parameters is considered to be their strong dependency on additional system parameters such as temperature or operating voltage. These system parameters are not known, and likewise must be estimated. As a solution, an MMAE scheme having a model bank of 49 different models is provided. For this purpose, the ARW noise and BI noise are each subdivided into seven different typical noise level classes. The combination results in the 49 EKF estimation processes which run in parallel, which are combined weighted with the probabilities of the validity of the noise level classes estimated in parallel. The problem of error correlation in all noise level classes used is not solved here.

SUMMARY OF THE INVENTION

It is an object of the present invention to overcome the described disadvantages of the architectures and methods for hybridizing data of various AOCS sensors used thus far.

The term "spacecraft" is understood to mean, for example, satellites, manned and unmanned spaceships, space stations, orbital gliders, supersonic aircraft, and the like.

In particular, the aim is to use a topology of the elements of the attitude and orbit control system (AOCS) which does not overload an AOCS bus of the spacecraft, a satellite, for example, which allows mounting of star sensors having low mass and heat output at sensitive locations, and/or which is equally applicable for all customary satellite missions. The aim is to use a method for hybridizing the measured values of different sensors of the attitude and orbit system (AOCS sensors), which is not limited to low performance requirements, which is not dependent on process steps to be carried out on the ground, which provides the EKF with input data which are actually largely decorrelated, which does not use fixed statistical parameters and instead estimates same online, and/or which has an automatically functioning interface for maneuver control of the spacecraft without using dynamic parameters of the spacecraft.

The topological basic principle, for example, is that neither integration of various sensors nor centralized measurement and control takes place in the central computer of the spacecraft. Instead of integration or centralization, a two-part interlinkage is used which divides the previous AOCS network in the form of a second bus, such as an AOCS bus, into an AOD network and an AOC network. The interlinkage concerns not only the exchange of data via the network, but also the interlinked data evaluation. Only the AOC network for controlling the spacecraft remains in the central computer of the spacecraft, whereas the detection and hybridization of the measured values take place in the second AOD network, which includes all the kinematic sensors and centralized sensor data processing.

The central processing unit for the measured value hybridization is preferably associated with the star sensor. This selection of the network center is optimal, since the star sensor requires the most complex internal algorithms, and therefore the essential prerequisites for the understanding of the other sensors are available due to the fact that only the star sensor is able to operate completely autonomously; that only the star sensor is able to deliver absolute position data of the required accuracy; that only the star sensor, as the center, provides the possibility for a "single sensor" and "gyroscope-free" system for position detection; that only the star sensor is a dedicated aeronautical product and, unlike gyroscopes, is not dominated by other markets; and that only the measuring method of the star sensor is able to directly determine the position as well as the position measuring error in a comparison with the star catalog.

For reasons of reliability, in addition to the central processing unit designated as the master, a second, redundant central processing unit is provided. For this purpose, the processing unit of a further AOCS sensor is used which is equivalent to the processing unit of the star sensor.

The principle of sensor networking requires no knowledge base transfer between different sensor developers; instead, it is based on the system characterization of various types of sensors without regard to their internal features.

At the same time, the principle of sensor networking allows unification of the AOD system without limitations. The number and quality of required sensors as well as the suitable criteria for the data hybridization may be freely selected within the scope of a unified approach, and require only appropriate configuration adjustments for actual implementation.

The limitation of the sensor network to purely kinematic data is optimal for the interaction with the orbit and attitude control system. The dynamic parameters, which are specific for each satellite and each mission, do not enter into the hybridization. The dynamic behavior of the satellite, to the extent necessary for the hybridization of kinematic measuring data, may be deduced from preclassified maneuver parameters and from the measured values.

The essential basic principle of the optimal method for hybridizing the measured values is that the standard EKF method of the AOD system is provided with largely uncorrelated hybrid measured values as an input. The decorrelation is possible only in the networked sensor configuration, and fully utilizes all complementary sensor properties. The method offers the advantage of complete autonomy with regard to data from the AOC system and from ground-based data evaluations. The coupling to the AOC occurs solely due to a configuration of mission maneuver parameters.

BRIEF DESCRIPTION OF THE DRAWINGS

The present invention is explained in greater detail below with reference to FIGS. 1 through 11.

DETAILED DESCRIPTION

Figure 1:
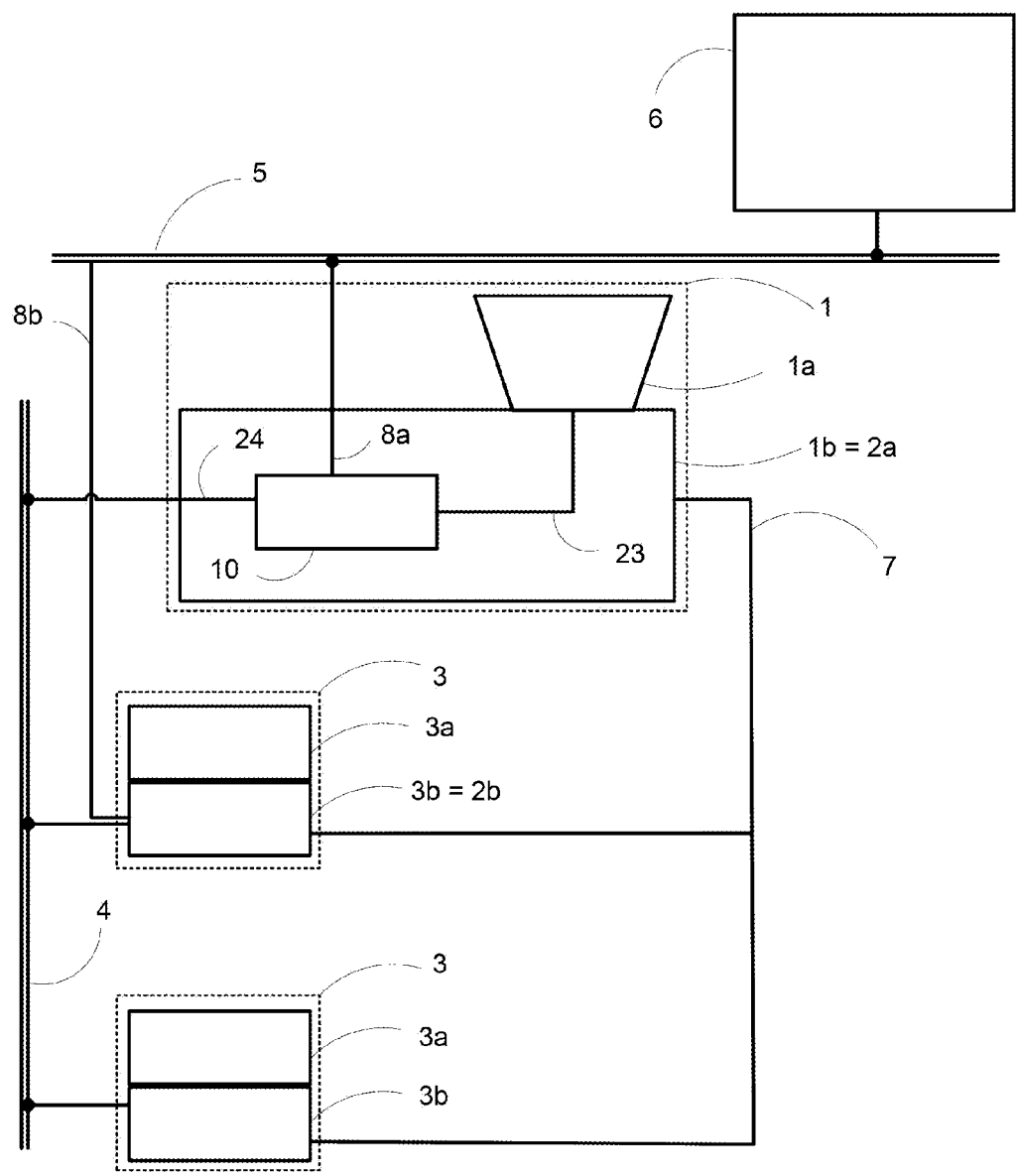
FIG. 1 shows a block diagram of the topology of the hybrid network of kinematic AOCS sensors according to the basic principle of the present invention.

FIG. 1 shows the preferably used configuration of the kinematic AOCS sensors in the sensor network and the connection to the AOCS of the spacecraft, for example a satellite.

Figure 2:
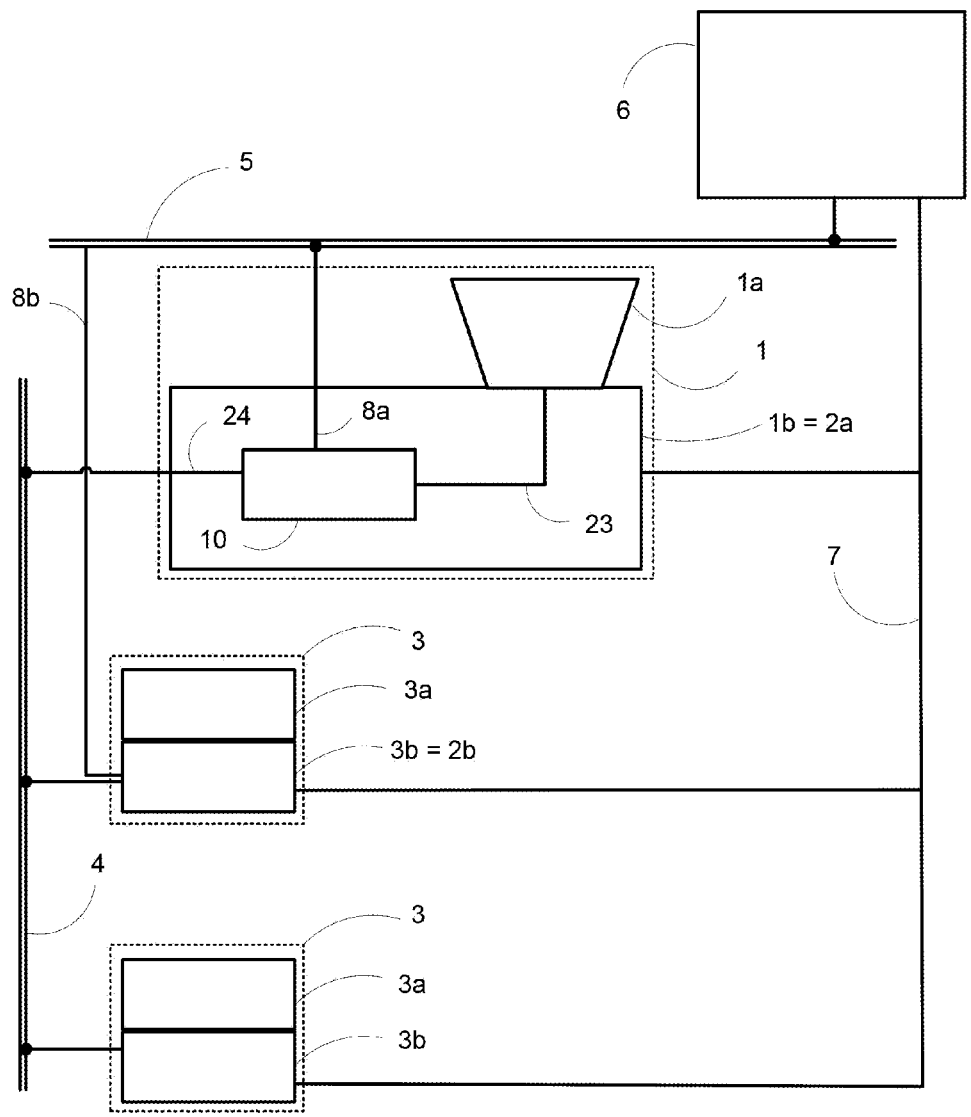
FIG. 2 shows a block diagram of the topology of the hybrid network of kinematic AOCS sensors according to the basic principle of the present invention, the centralized time pulse being provided by the satellite computer.

Star sensor 1, made up of camera head 1a and processing unit 1b, is connected to other types of sensors 3 via the first bus as a sensor bus 4. Processing unit 1b of the star sensor, as central master processing unit 2a, takes over the star sensor-specific data processing as well as the function of optimized hybridization processor 10. For reliability reasons, a second, equivalent processing unit 3b of one of the other sensors 3 as AOCS sensors is designated as redundant central processing unit 2b. The second processing unit takes over the function of central master processing unit 2a in the event that it fails, and is likewise connected to the second bus as AOCS bus 5. In the case of redundancy, the second processing unit delivers optimally hybridized kinematic measuring data 8b. The other sensors may also have processing units, which, however, do not process tasks for multiple sensors. All sensors deliver their synchronized measuring data to optimized hybridization processor 10. The synchronization may take place in such a way that all sensors measure at the same point in time, or that the measuring data contain a time stamp based on a uniform time pulse. The synchronization takes place based on the time pulse provided by central processing unit 2 via synchronization line 7. The time pulse for the sensors may be generated by central processing unit 2 itself, or a clock pulse provided by the AOCS of the spacecraft, for example a satellite, may be relayed. The configuration for the case of the clock pulse being provided by the central computer of the spacecraft, such as a satellite computer, is illustrated in FIG. 2. When the time pulse is taken over by the spacecraft, the optimally hybridized kinematic measuring data 8 do not have to contain a time stamp which is calibrated with the spacecraft, as is necessary in the case of localized time pulsing within the AOD network. The synchronous position measuring data and the associated position covariance are determined in star sensor 1 itself, based on the image data of camera head 1a, and are likewise included in the hybridization. Optimally hybridized kinematic measuring data 8 are transmitted via the AOCS bus of the spacecraft to central computer 6, where they are used for controlling the spacecraft.

Figure 3:
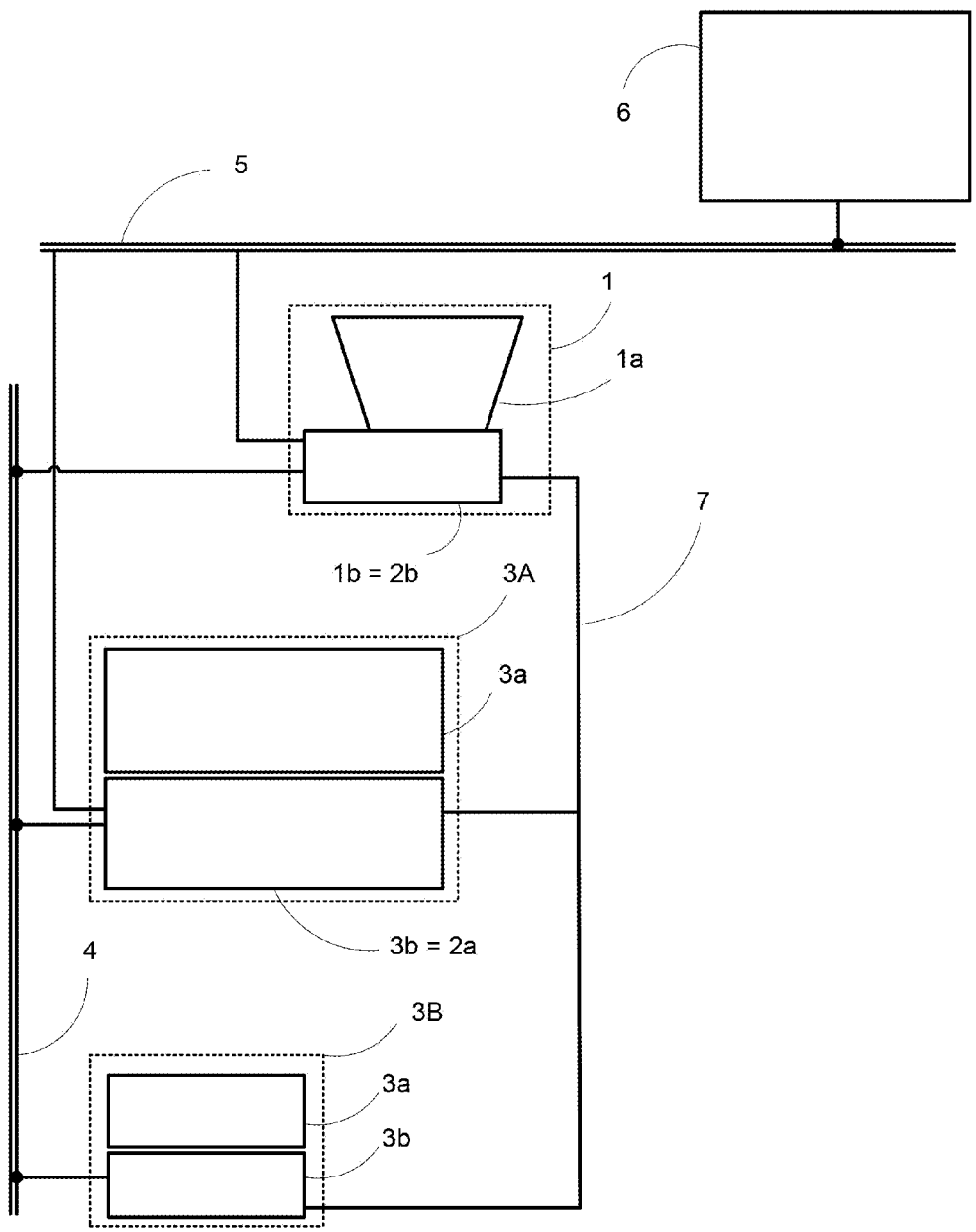
FIG. 3 shows a block diagram of the topology of the hybrid network of kinematic AOCS sensors, with a gyroscope rotation rate sensor and an earth sensor as additional kinematic AOCS sensors, the processing unit of the gyroscope rotation rate sensor being designated as the central master processing unit, and the processing unit of the star sensor playing the role of the redundant central processing unit.

Under some circumstances it may be more advantageous for the role of central master processing unit 2a to be taken over by the processing unit of gyroscope sensor 3A, as depicted in FIG. 3. One possible reason for selecting this configuration may be that a high-quality gyroscope which is customarily already being used, and which has a very powerful processing unit and very high data rates, is to be integrated into the sensor network. In this case it may be more advantageous to use the processor which is present in the gyroscope first for the centralized tasks, and to relieve sensor bus 4 of the high data rates of the gyroscope. In this variant, the processing unit of the gyroscope is nominally connected to central computer 6 via AOCS bus 5, and the processing unit also provides the other sensors with the uniform clock pulse via synchronization line 7. In the present case, processing unit 1b of the star sensor is limited to the role of redundant central processing unit 2b.

Figure 4:
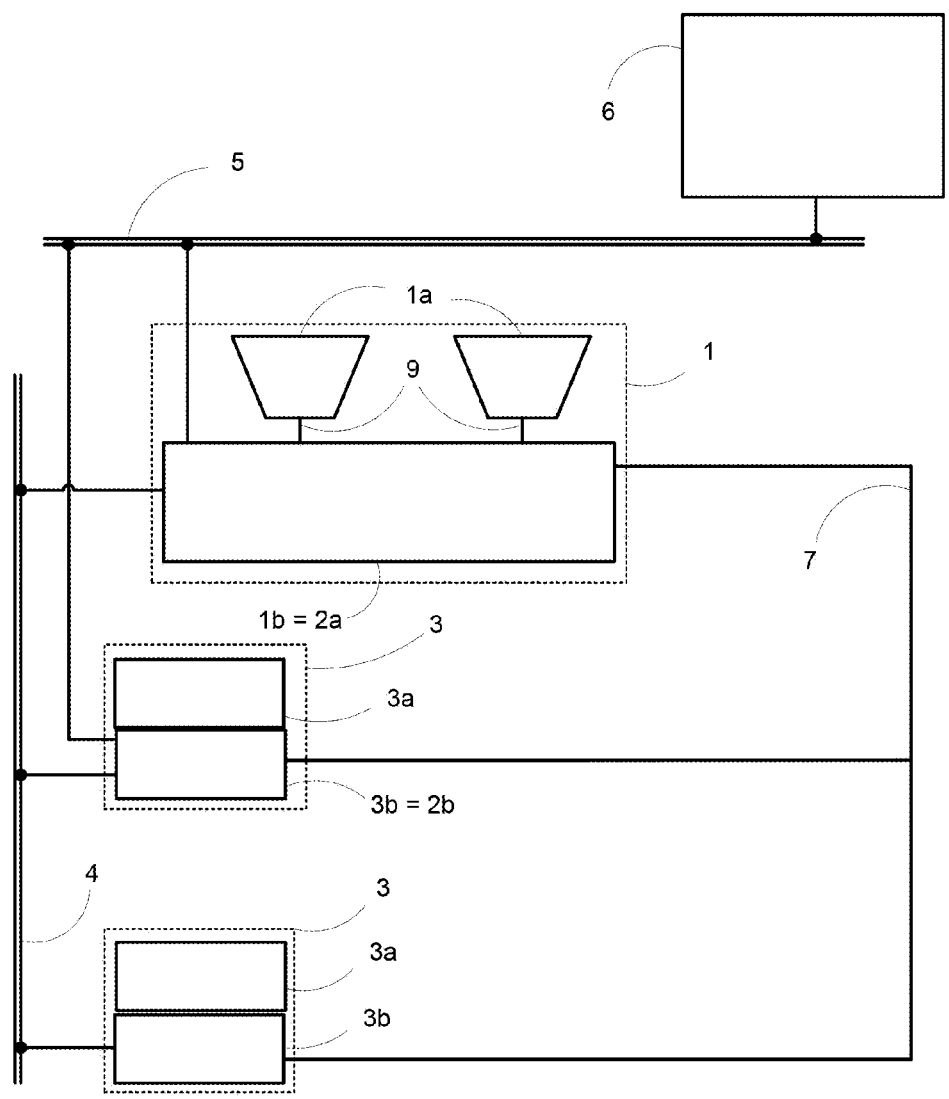
FIG. 4 shows a block diagram of the topology of the hybrid network of kinematic AOCS sensors, with the camera heads of the star sensor detached.

Two star sensor camera heads 1a are frequently used for observation missions in a near-Earth orbit. The corresponding variant of the sensor network is illustrated in FIG. 4. In FIG. 4, both star sensor heads 1a use the same processing unit 1b, and are detached from same via one point-to-point data connection 9 each. This configuration is advantageous when a camera head is to be directly mounted on the primary instrument of the spacecraft. The orientation of the primary instrument may be directly measured in this way. Due to its low mass and thermal energy output, the camera head without a processing unit does not result in much interference with the primary instrument. In addition, variants (not illustrated) having three or more camera heads are usable. Furthermore, only one camera head may be detached from the processing unit of the star sensor, whereas the second camera head together with the processing unit forms an integrated device.

Figure 5:
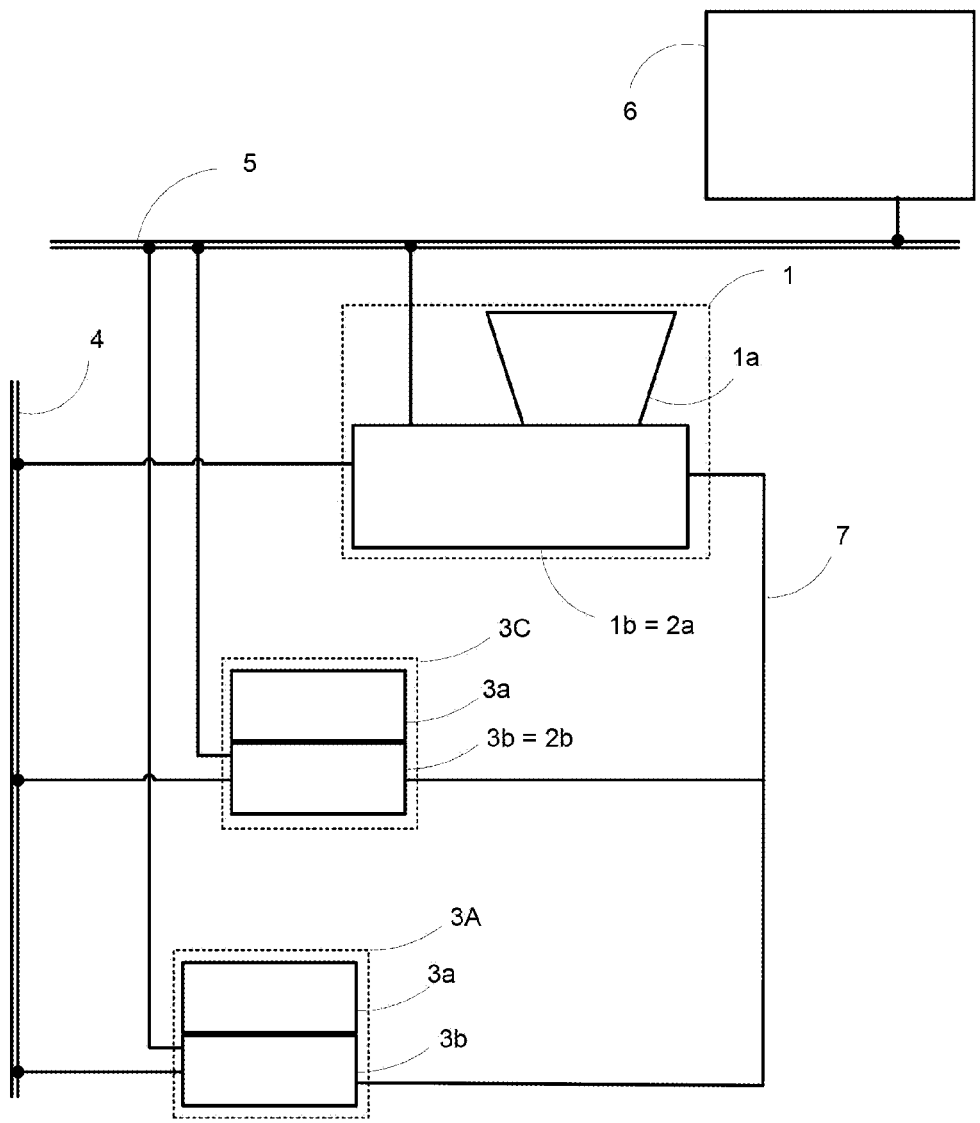
FIG. 5 shows a block diagram of the topology of the hybrid network of kinematic AOCS sensors, the processing unit of the GNSS sensor being designated as the redundant central processing unit, and the gyroscope rate sensor, as an emergency sensor, also being directly connected to the AOCS bus.

It is conceivable to use the AOCS individual sensors not only for the nominal attitude and orbit control, but also for other tasks. An additional connection of this multiply used sensor to the AOCS bus may then be established, as illustrated in FIG. 5. In FIG. 5, processing unit 3b of GNSS sensor 3C, for example, is used as the redundant central processor, whereas gyroscope sensor 3A is additionally used as an emergency sensor for the spacecraft. The gyroscope sensor is therefore connected to the AOCS bus in addition to central processing units 2a and 2b of the sensor network. Similarly, other sensors may be provided with an additional connection to the satellite computer in order to be ready for emergencies or other cases of operation outside the nominal AOD. The additional connection of the affected sensor does not have to be made via the AOCS bus, and instead may be established in some other way, such as a point-to-point connection.

Figure 6:
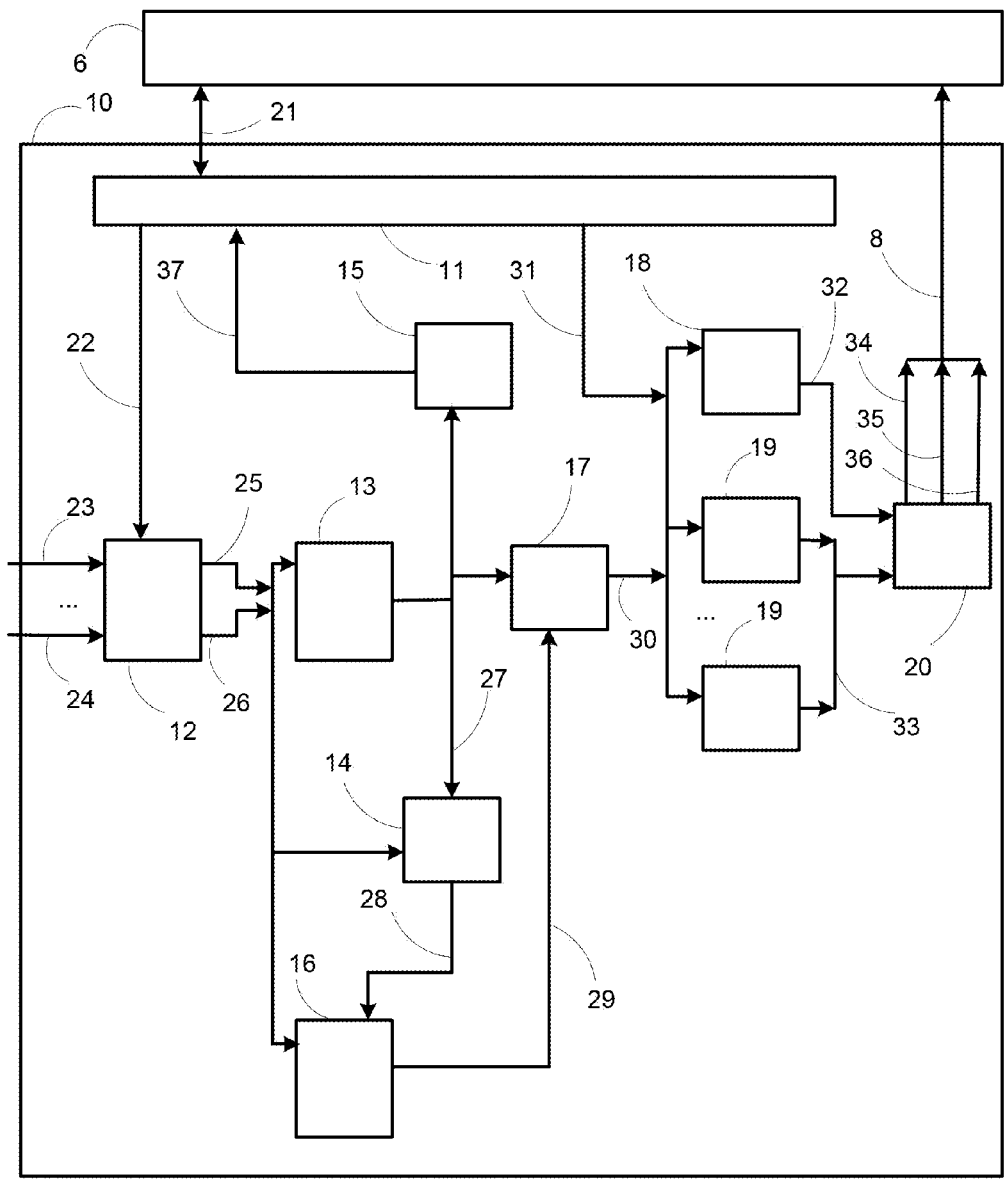
FIG. 6 shows a block diagram of the general optimized method for hybridizing kinematic measuring data of AOCS sensors.

FIG. 6 shows the general block diagram of the method which is implemented by optimized hybridization processor 10 on the hardware of central processing unit 2.

Position measurement and position covariance data 23 of star sensor and measuring data 24 of additional kinematic AOCS sensors 3 are synchronized with the aid of the time pulse which is provided via synchronization line 7, i.e., are obtainable at the same point in time of measurement. To be able to compare and combine the data of different sensors, the data must be transformed into a uniform coordinate system which is used as a reference. This occurs in transformation processor 12. In principle, the reference is freely selectable. For example, the system required by the central computer, usually the coordinates of the spacecraft, such as satellite coordinates, may be used when a further transformation is to be avoided. In the use of gyroscope sensors having different parameters of the individual axle gyroscopes, use of the gyroscope coordinate system as a reference may simplify the processing.

The rotations of the individual sensors with respect to the reference system are used as transformation parameters 22. These may be provided as Euler angles, quaternions, or rotation matrices. The starting values of the transformation parameters are measured during manufacture and integration of the sensors into the spacecraft, and are available in configuration parameter memory 11. The orientation of the sensors may slowly change due to thermoelastic deformation of the mechanical structure of the spacecraft, which is compensated for by updated transformation parameters 37, the updating being an integral part of the method.

All measured values in the uniform reference system, position measurement and position covariance data 25 of the star sensor, and data 26 of the additional kinematic sensors undergo a reduction 13 of the errors and of the error correlation. The reduction is possible due to the different error composition for different types of sensors. The measured value components having the least errors and the least error correlation are taken over by the sensor which is most favorable for a certain signal spectrum, whereas the corresponding signal components of the other sensors are deleted. This procedure does not use fixed sensor models, such as in the form of polynomials, and instead instantaneously estimates the parameters based only on the physical basic principles of the sensors and the measured values.

The different properties of the sensors may be used not only for improving measured values in the sense of reduction 13 of the errors and the error correlation, but also for mutual assistance of calibration parameters 14 internal to the sensor. In the nominal case this cross-calibration is not necessary, since reduction 13 of the errors and the error correlation implicitly compensates for any errors in the calibration parameters. However, in the non-nominal case, when individual sensors temporarily fail, the use of hybrid calibration data 28 from cross-calibration 14 is crucial for the quality of the measurements of the sensor which remains in nominal status. Due to the cyclical pattern of the cross-calibration, this results in adaptability to fluctuations in calibration parameters over time.

If the nominal measured value processing with reduction 13 of the errors and the error correlation is no longer possible in the non-nominal mode due to the absence of some sensors, a second non-nominal processor 16 for generating the easily degraded non-nominal positions and rates 29 may be used. This processor may also run in the nominal case, but its results are enabled for the subsequent processing only when a non-nominal signal of one of the sensors is provided by mode switch 17.

When analyses are used in the slowest time scale, in which neither the white sensor noise nor miscalibrations internal to the sensor have an effect, the trend of the misalignments of the sensors caused by thermoelastic distortions may be determined in a trend identification 15. Result 37 of the trend analysis of transformation unit 12 is instantaneously provided via configuration parameter memory 11.

The best available hybridized measuring data 30 in each case, either the nominal error-reduced positions and rates 27 or corresponding non-nominal values 29, are entered as inputs in a bank of extended Kalman filters 19 for different models of maneuvers of the spacecraft defined by maneuver parameters 31. In parallel with measured values 30, the EKF processors use parameters 31 of the maneuver models from configuration memory 11. The same data 30 and 31 are entered into MMAE estimator 18, which provides the probability of validity 32 of the maneuver types. Based on these probabilities 32, maneuver switch 20 selects those EKF outputs 33 which correspond to the most likely maneuver type. Optimally hybridized kinematic measuring data 8, made up of the optimal estimations for position 34, rate 35, and position covariance 36, selected in this way ultimately are provided to central computer 6.

Model parameters 31 of the maneuvers may be provided in the form of certain maneuver profiles of the rate and the angular acceleration. Such profiles are already used as test data for verifying star sensors. In the simplest standard case, the two models "constant rate" and "constant angular acceleration" may be used.

Figure 7:
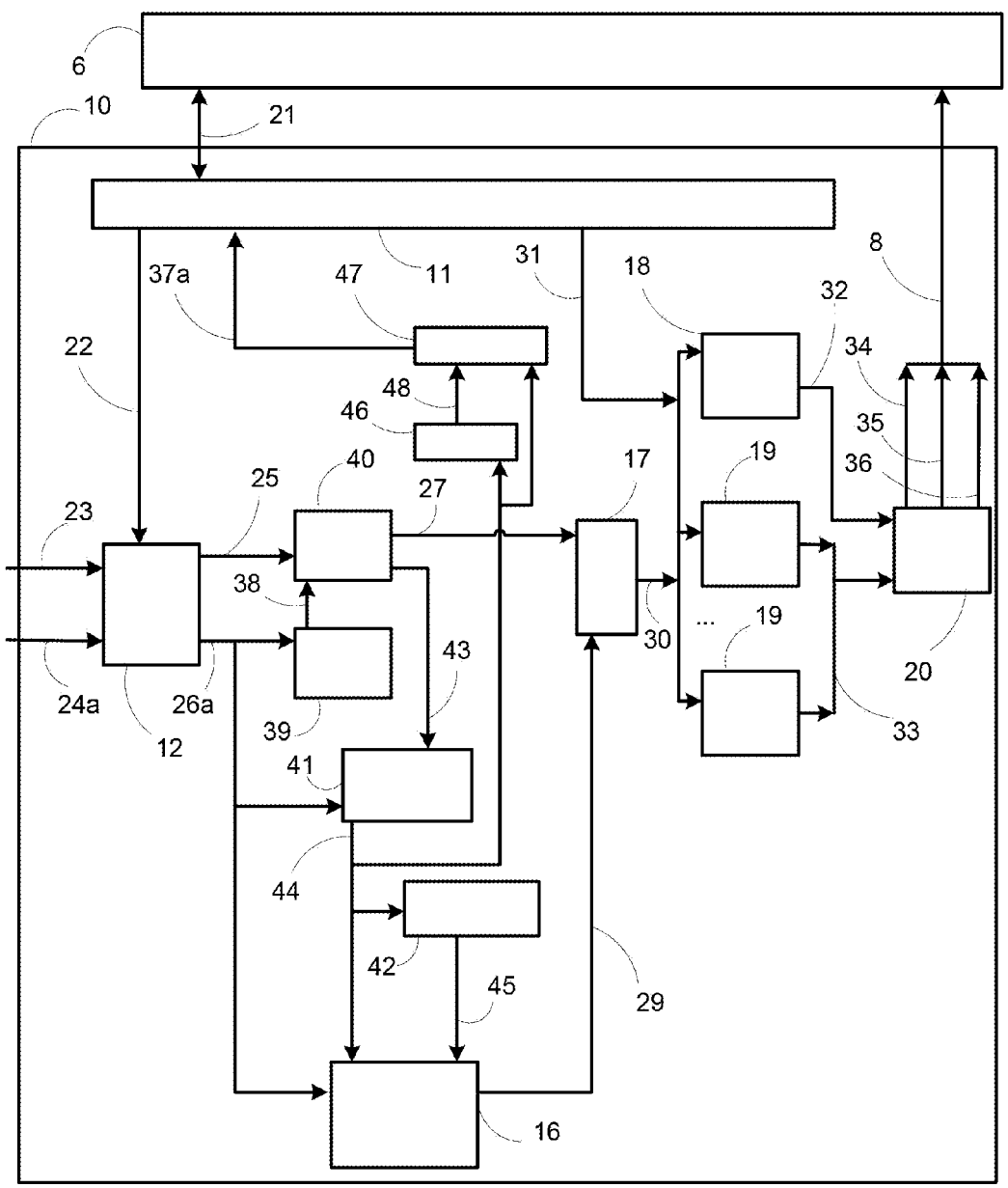
FIG. 7 shows a block diagram of the method for hybridizing kinematic measuring data of star sensors, and a gyroscope rotation rate sensor.

FIG. 7 illustrates the block diagram of the method for processing the measured values of the two main sensors of the AOD, namely, position measurement and position covariance data 23 of at least one star sensor, and rate measuring data 24a of a gyroscope. In this configuration, reduction 13 of errors and of the error correlation is implemented by two blocks: rate integration 39 and maximum likelihood fit 40. The reduction of errors and their correlation is specifically tailored to the composition of the star sensor errors and gyroscope errors. An average quality is sufficient for gyroscope sensor 3A, since the utilization of the synergies between the gyroscope and the star sensor results in performance that is comparable to high-quality gyroscopes.

Figure 8:
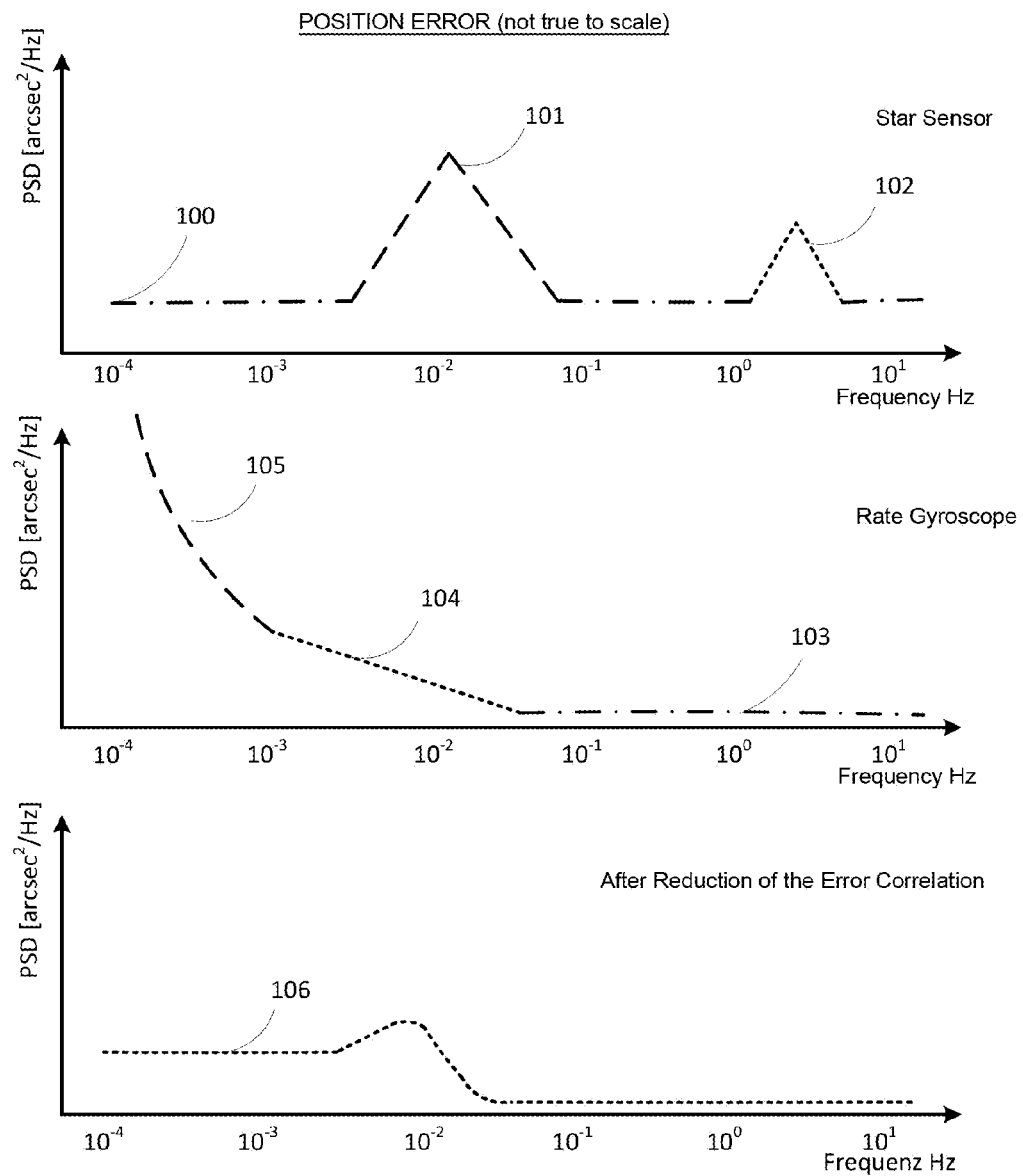
FIG. 8 shows an illustration of the spectral error energy density of the star sensor position, the gyroscope position, and the hybridized position.

The top section of FIG. 8 illustrates the composition of the position errors of a star sensor, and the center section illustrates the error components of the integrated rates of an average-quality gyroscope. The position errors are schematically illustrated in power spectral density (PSD) form as the error power spectral density of the position angle errors. The mode of operation of the error reduction is explained below with reference to this illustration.

Both sensors have an error component of the white noise of the position angle, referred to as the noise equivalent angle (NEA) error. In the star sensor, NEA component 100 is larger than NEA component 103 for the integrated rates of the gyroscope. The classical EKF approach is designed for reducing the NEA components. Correlated error components may be slightly reduced by Kalman filters, and under some circumstances may also be increased. There are two correlated noise components in the star sensor: low-frequency LF component (low frequency LF) and high-frequency HF component (high frequency HF). LF error 101 has primarily geometric origins in the range of the image field of the star sensor camera. The conversion of these in essence spatial low spatial frequency errors (LSFE) into temporal errors is a function of many variable parameters, so that a valid model, as a polynomial, for example, does not exist. The LF error is within the time scale of seconds to minutes, and is particularly critical for the AOC, since the controller for controlling the spacecraft operates in this frequency range. HF error 102 of the star sensor is within the time scale of less than one second, and is likewise caused largely geometrically by high spatial frequency error (HSFE) effects at the pixel level in the star sensor camera. The HF error is less than the LF component, and is less critical for the controller for controlling the spacecraft.

For average-quality gyroscopes, only the white noise of NEA component 103 of the error in the integrated rates acts in the frequency range of the HF error of the star sensor, and acts in the upper portion of the frequency range of the LF error. For the gyroscope, the angle random walk (ARW) errors having a linear frequency characteristic 104 are present in the lower minute range, and beginning with the upper minute range, the bias instability (BI) errors having a higher-order frequency characteristic 105 are present.

It is apparent from the two described spectral curves of the position errors for star sensors and integrating rate gyroscopes that in the upper and middle frequency ranges, preferably the better gyroscope data must be taken over in the hybridization, and the corresponding star sensor components must be deleted. The star sensor data should dominate in the lower frequency range. This is precisely the strategy that is followed by reduction 13 of the errors and of the error correlation, which is made up of rate integration 39 and maximum likelihood fit 40.

Rate integration 39 is designed as a sliding time window. Transformed measured rate values 26a within the time window are buffered. The length of the time window results from the frequency characteristic of the position errors of the star sensor and the gyroscope, illustrated in FIG. 8. For the optimally selected window length, ARW error components 104 of the gyroscope must be even better than LF errors 101 of the star sensor. For a measuring cycle of approximately 10 Hz, this results in several hundred to a few thousand measured values in the buffer memory. This is not problematic for recent processing units 2. Measured and transformed rates 26a within the window are corrected in rate integration 39, using the instantaneous calibration parameters of the bias and the scaling factor, and are added to rotational angles about the three axes of the reference system. Initially, the calibration parameters from the ground measurement, stored in configuration parameter memory 11, are to be used; during ongoing operation, instantaneous values 44 and 45 from cross-calibration 14 are used.

Figure 9:
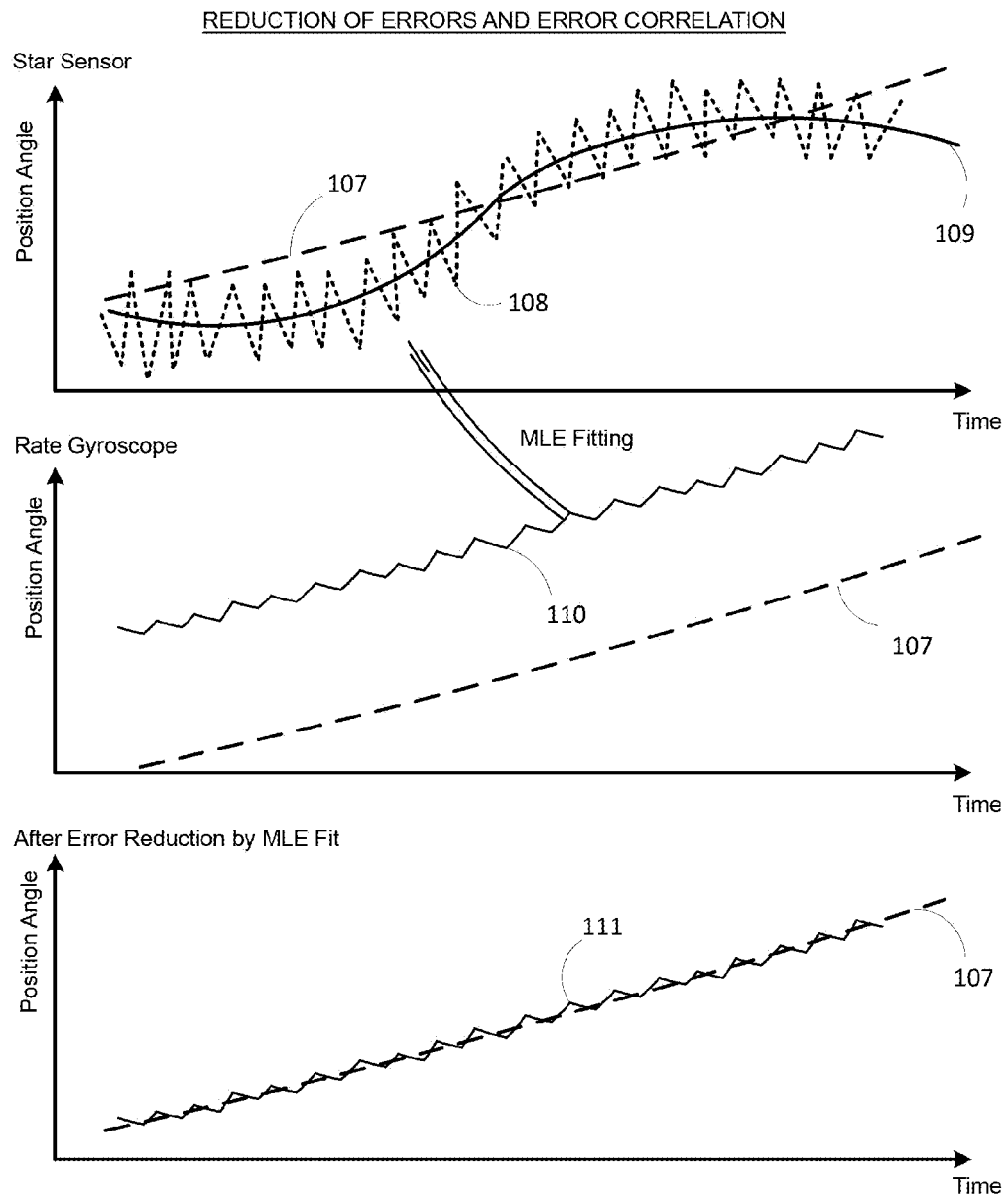
FIG. 9 shows an illustration for explaining the mode of operation of the reduction of errors and of the error correlation by MLE fitting.

The middle portion of FIG. 9 illustrates a position angle 110 in the time window which is generated in this way from the rates. The same diagram shows true curve 107 of the position angle. There is an offset between the two curves which is determined essentially by the difference between the starting value of the position integration and the corresponding true position. The offset may be minimized by using the position from the most recent cycle as the starting value. However, this is not absolutely necessary, since the offset is compensated for anyway by MLE fit 40.

The top diagram in FIG. 9 shows curve 108 of measured position values 25 from the star sensor in the same time window. In this case there is no offset with respect to true position 107, since the star sensor measures the absolute position. Curve 108 shows the NEA and HF error components of the star sensor with a high rate of change. These error components are larger than in gyroscope curve 110 in the middle diagram. Curve 109, which corresponds to the star sensor measurement without NEA and HF errors, is shown for explaining the LF error of the star sensor.

MLE fit 40 is linear, and determines the statistically optimal shift and rotation of curve 110 with the objective of minimizing the error for curve 108. The distances between the measuring points are weighted with the inverse covariance from the star sensor, so that not only an LSR estimation, but also a genuine MLE estimation is carried out. Curve 111 in the bottom diagram in FIG. 9 shows the optimally shifted and rotated rate position. This position optimally corresponds not only to star sensor position 108, but also to true position 107. The last point on optimal curve 111 represents the decorrelated position in data output 27 for the instantaneous point in time of measurement, and is situated at the right end of the time window. Normally, the last measured gyroscope value may be directly taken as the decorrelated rate in output 27. Under some circumstances, it may be more optimal to use the rate as the difference between the last two decorrelated positions. This is applied when there are particularly high accuracy requirements for the rate, or when significant miscalibrations of the gyroscope are suspected.

Rate integration 39 and MLE fit 40 repeat cyclically in the clock pulse of the measurements. The time window is shifted by one position, and the most recent set of measured values is deleted and a new set of values is added. To reduce the required number of operations, the optimizations, which are customary in applications with sliding windows, may be utilized by reusing intermediate results. Approximations which are necessary for this purpose, such as a change in the calibration parameters having a low repetition rate, result in only negligible errors.

The bottom diagram in FIG. 8 shows a schematic illustration 106 of the error power spectral density of the position angles after application of rate integration 39 and MLE fit 40. In the lower frequency range, the decorrelated positions at output 27 have the quality of the star sensor data, and in the upper frequency range have the quality of the gyroscope data. Only in the lower portion of the LF component of the star sensor errors is the error not completely reduced to white noise. This would require costly gyroscopes having enhanced ARW parameters.

Star sensors may malfunction for brief to moderate time periods due to blinding or radiation. Bridging these down times with position measurements based only on the gyroscope data requires accurate, instantaneous calibration of the gyroscope. Cross-calibration 14 provides these calibration data 28 in the special use as a converter 41 and separator 42 for the separate estimation of the bias and the scaling factor. Bias errors and scaling factor errors are reliably detectable only over fairly long measuring periods. The time scale of rate integration 39 and of MLE fit 40 is not suitable for this purpose. The bias and the scaling factor are partially influenced by the same factors, so that the corresponding errors are not uncorrelated and are difficult to separate. Determining the scaling factor errors also requires high rates in addition to the required time scale.

Under the assumption that the bias is constant, the bias is reflected in an offset between the true position and the gyroscope position which increases linearly over time. For constant scaling factor error, the effect of a linear increase in the rate error is observed via the actual rate. In the rates which are integrated in angles, a constant scaling factor error thus has the effect of a quadratically increasing position error. However, the increase takes place over the actual rate, not over time. This complex mode of operation, and the fact that the bias and the scaling factor are not constant over time, make it impossible to derive the bias and the scaling factor from fit bias 122 and fit angle 113 determined in MLE fit 40, as illustrated in the top portion of FIG. 10. This is also true for the case that the time scale of MLE fit 40 would have been extended to the range of action of the bias instability. The bias instability and the scaling factor error are always found intermingled with fit bias 122 and fit angle 113, and must be separated using other methods.

The estimation of the bias is simpler, since at the output of MLE fit 40 it already dominates over the scaling factor error in values 43 of the fit bias. In addition, high rates having a scaling factor error with a strong effect occur very rarely over the course of a mission. Estimated bias values 44 are therefore easily estimated in converter 41 by low pass filtering of values 43 applied by MLE fit 40 corresponding to the time scale of the bias instability and the scaling factor error.

Figure 10:
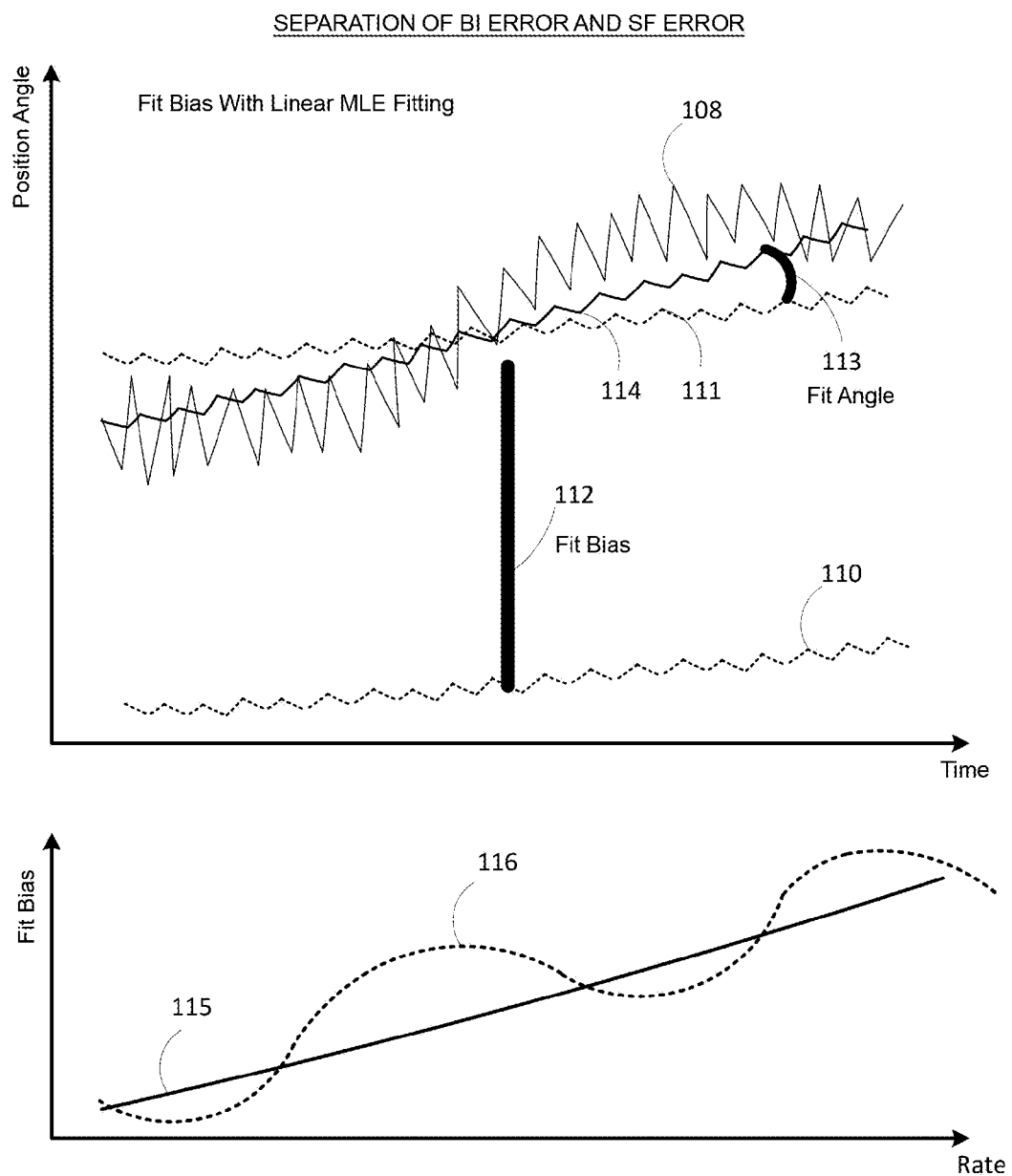
FIG. 10 shows an illustration for explaining the procedure for separating BI errors and SF errors.

Unprocessed measured rate values 26a and values 43 of the fit bias must be resorted to for estimating the scaling factor. Values 43 of the fit bias are buffered as a function table of measured rate values 26a. For this purpose, a table is created within the scope of a sufficient raster of the dynamic range of the gyroscope. Values 43 of the fit bias which are part of the rasterized rate values are accumulated in averaged form in this table with the aid of an infinite impulse response (IIR) filter. Curve 116 in the bottom portion of FIG. 10 illustrates the result of the transformation of values 43 of the fit bias from time-space into rate-space. In this illustration, the estimated scaling factor values 45 may be determined as the rise in a regression line 115.

In this configuration, non-nominal processor 16 determines, based solely on instantaneously measured rate values 26a, the easily degraded non-nominal positions and rates 29 for the time period of the temporary unavailability of the star sensor data. This takes place by correction and integration of measured rate values 26a beginning at the point in time when the non-nominal signal from the star sensor is first present. At the same point in time, the most recent values of scaling factor 45 and of bias 44 for correcting measured rate values 26a which are still estimated using present measured values 25 of star sensor 1 are taken over for the entire downtime period of star sensor 1.

In determining the variable misalignments of the sensors in trend identification 15, there is the problem, similarly as for the bias and scaling factor estimation, of overlapping bandwidths having different activity factors. This is illustrated in the top portion of FIG. 11, which shows the summary spectral power density of all position errors together with the bandwidths for bias instability and scaling factor error 117, for misalignment trend 118, and for NEA and ARW/LF residual errors 119 which remain despite error reduction. The trend may not be separated from the other types of error by simple band pass filtering. Some other discriminating criterion, and not the frequency, must be used for this purpose.

Thermoelastic distortion results from the structure of the spacecraft, which is fixedly bound to the satellite coordinate system. The thermoelastic distortion occurs primarily about a certain torsion axis in this structure. This distinguishes the trend from other position error components. In the star sensor, the errors are a function, for example, of the position of the image field in the sky, or of the position of the star in the image field and in the pixel, and have alternating rotational axes in the coordinate system of the spacecraft.

Figure 11:
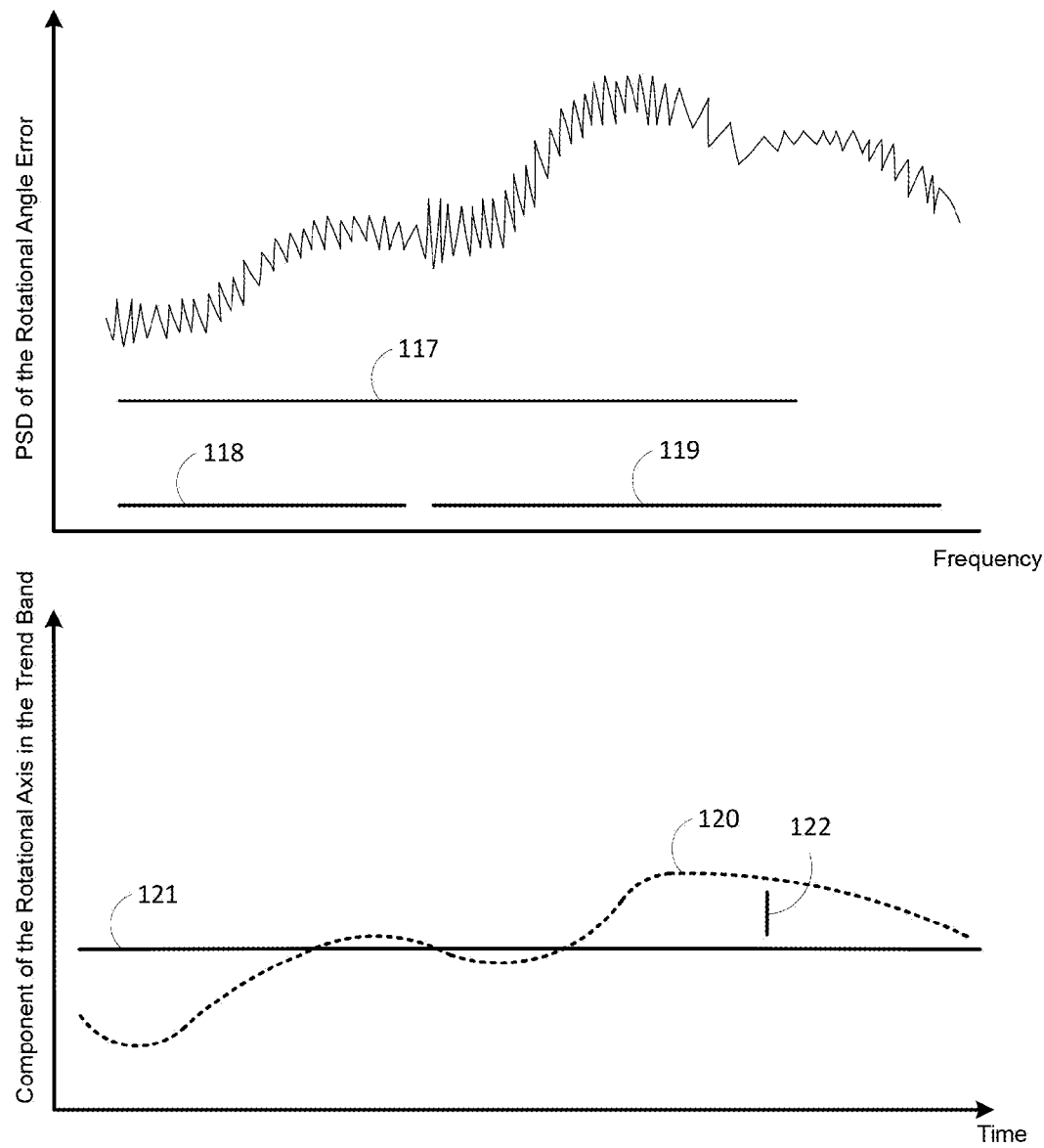
FIG. 11 shows an illustration for explaining the procedure for identifying the misalignment trend.

This identification feature may preferably be utilized by estimating the constant component of the position error rotational axes in a torsion axis estimator 46. For this purpose, the delta rotation of the position error must be converted into the corresponding rotational axis components and the rotational angle. Estimated bias values 44, which represent nothing more than the low pass-filtered values of the fit bias, may be used as position errors. The bottom portion of FIG. 11 illustrates curve 120 of the values of an axis component of the low pass-filtered position errors. Constant average value 121 of this curve 120 represents the corresponding component of the torsion axis. Difference 122 reflects the other position errors in the same frequency range which are not part of the distortion trend. The three average values of the axis components form estimated torsion axis 48, and together with estimated bias values 44, used as the position error, are included in estimation 47 of the delta rotation matrix of the distortion. Transformation parameters 37*a* may thus be updated corresponding to the trend. The connection rotational angle in addition to the distortion rotational axis is necessary for this purpose. The connection rotational angle may be computed from the projection of the overall position error rotation on the torsion axis.

LIST OF REFERENCE NUMERALS 1 star sensor
1*a* star sensor camera head
1*b* processing unit of the star sensor
2*a* central master processing unit
2*b* redundant central processing unit
3 additional kinematic AOCS sensors
3*a* sensor element of an additional kinematic AOCS sensor
3*b* processing unit of an additional kinematic AOCS sensor
3A gyroscope rotation rate sensor
3B earth sensor
3C GNSS sensor
4 sensor bus, first bus
5 AOCS bus of the satellite, second bus
6 central computer
7 synchronization line
8 hybridized kinematic measuring data
8*a* hybridized kinematic measuring data of the master processing unit
8*b* hybridized kinematic measuring data of the redundant processing unit
9 point-to-point data connection
10 optimized hybridization processor
11 configuration parameter memory
12 transformation processor
13 reduction of errors and error correlation
14 cross-calibration
15 trend identification
16 non-nominal processor
17 mode switch
18 MMAE estimator
19 six-dimensional EKF
20 maneuver switch
21 configuration data
22 transformation parameter
23 synchronous position measuring data and position covariance of the star sensor
24 other synchronous kinematic measuring data
24*a* synchronous rate measuring data of the gyroscope
25 position data and position covariance of the star sensor in the reference system
26 other measuring data in the reference system
26*a* rate measuring data in the reference system
27 decorrelated positions and rates
28 hybrid calibration data
29 non-nominal positions and rates
30 best positions and rates
31 maneuver parameter
32 probabilities of validity of the maneuvers
33 EKF estimated values for position, rate, and covariance for the various maneuver models
34 optimal estimated values of the position for the valid maneuver
35 optimal estimated values of the rate for the valid maneuver
36 optimal estimated values of the position covariance for the valid maneuver
37 transformation parameters updated according to the trend
37*a* transformation parameters updated according to the trend, using the delta rotation matrix
38 integrated rates
39 rate integration
40 MLE fit
41 conversion of the band pass-filtered values of the fit bias from time-space into rate-space
42 BI & SF separator
43 values of the fit bias
44 estimated bias values
45 estimated scaling factor values
46 estimation of the torsion axis
47 estimation of the delta rotation matrix of the distortion
48 estimated torsion axis
100 PSD of the NEA position error of the star sensor
101 PSD of the LFE position error of the star sensor
102 PSD of the HFE position error of the star sensor
103 PSD of the NEA position error of the integrated rates of the gyroscope
104 PSD of the ARW position error of the integrated rates of the gyroscope
105 PSD of the BI position error of the integrated rates of the gyroscope
106 PSD of the hybridized position after reducing the errors and the error correlation
107 true position
108 position of the star sensor with LFE, HFE, and NEA errors
109 position of the star sensor with only LFE errors
110 position of the gyroscope with BI, ARW, and NEA errors
111 shifted and rotated rate position
112 fit bias
113 fit angle
114 shifted rate position
115 regression line of the fit bias components due to errors in the scaling factor
116 fit bias due to scaling factor error and bias instability
117 bandwidth of BI and SF errors
118 bandwidth of trends of the distortion
119 bandwidth of NEA errors and of reduced ARW and LF errors
120 variable rotational axis of all influencing factors in the trend band 121 fixed rotational axis of the distortion
122 displacements of the rotational axis due to apparent distortions

What is claimed is:

1. An attitude and orbit control system of a spacecraft for a spacecraft, comprising:
    a star sensor including an optical camera head, and a processing unit provided as a central master processing unit;
    additional kinematic sensors, each including a sensor element and an additional processing unit, one of the additional processing units being equivalent to the processing unit and being designated as a redundant central processing unit;
    a first bus connecting the additional kinematic sensors to the central master processing unit and the redundant central processing unit;
    a synchronization line for providing a uniform time pulse from the particular active central processing unit of the central master processing unit and the redundant central processing unit to the additional kinematic sensors; and
    a connection of the master central processing unit and the redundant central processing unit to a second bus of the spacecraft, via which the particular active central processing unit supplies a central computer of the spacecraft with hybridized kinematic measuring data generated according to a method for hybridization based on the synchronous kinematic measuring data of the star sensor and measuring data of the additional kinematic sensors.

2. The attitude and orbit control system as recited in claim 1 wherein the uniform time pulse is provided by the spacecraft via a synchronization line.

3. The attitude and orbit control system as recited in claim 1 wherein an arbitrary combination of gyroscope rotation rate sensors, acceleration sensors, magnetometers, solar sensors, earth sensors, or GNSS sensors is provided as the additional kinematic sensors.

4. The attitude and orbit control system as recited in claim 1 wherein the redundant additional processing unit takes over the role of the central master processing unit, and the central master processing unit of the star sensor is then designated as the redundant central processing unit.

5. The attitude and orbit control system as recited in claim 1 wherein the star sensor is formed from at least two camera heads and the central master processing unit.

6. The attitude and orbit control system as recited in claim 1 wherein at least one of the star sensor and the additional kinematic sensors are connected to the second bus of the spacecraft.

7. The attitude and orbit control system as recited in claim 1 wherein at least one of the star sensor and the additional kinematic sensors are directly connected to the central computer.

8. The attitude and orbit control system as recited in claim 1 wherein a camera head of the star sensor is detached from the master central processing unit and connected to the master processing unit according to the point-to-point principle.

9. A method for generating hybridized kinematic measuring data from synchronous position measuring data and position covariance data of at least one star sensor and from the synchronous measuring data of additional kinematic sensors, the method comprising the following processing steps:
    transforming coordinates of the synchronous position measuring data and position covariance data and the synchronous measuring data of additional kinematic sensors into a uniform reference system with the aid of a transformation processor, using transformation parameters, and
    parallel relaying of the position measuring data and position covariance data of the star sensor and the additional kinematic measuring data transformed into the uniform reference system, to a reduction of the errors and of the error correlation, to a cross-calibration, and to a non-nominal processor,
    generating decorrelated positions and rates having reduced covariance in the reduction unit by replacing strongly correlated components of the measuring data of a sensor with slightly correlated data of another sensor,
    parallel relaying of the decorrelated positions and rates to the cross-calibration and to a trend identification, and to a mode switch,
    identifying a long-term trend of the transformation parameters for transforming the measuring data and of all sensors into the uniform reference system in a trend identification, and storing the transformation parameters, updated according to the trend, in a configuration parameter memory, the transformation parameters being used from the parameter memory for subsequent transformations,
    generating hybrid calibration data in the cross-calibration from the measuring data transformed into the uniform reference system, and from the decorrelated positions and rates,
    generating non-nominal positions and rates in the non-nominal processor, the data of sensors having non-nominal status not being used, and nominally operating sensors being calibrated with the aid of the hybrid calibration data, and relaying the non-nominal positions and rates to the mode switch,
    selecting the decorrelated positions and rates, or of the non-nominal positions and rates, as a function of the nominal or non-nominal status of the sensors, and relaying the selected position data and rate data to a bank of six-dimensional EKF estimators defined by configurable maneuver parameters, and to an adaptive multiple model estimator controlling the bank,
    determining probabilities of the validity of maneuvers in the adaptive multiple model estimator, based on the selected position data and rate data and maneuver parameters from the configuration parameter memory, and relaying the probabilities of the validity of the maneuvers to a maneuver switch, and
    selecting a result of the six-dimensional EKF estimator having the highest probabilities of the validity of the maneuver in the maneuver switch, and relaying the selected optimally hybridized kinematic measuring data, made up of the optimal estimations for the position, the rate, and the position covariance, to the central computer of the spacecraft.

10. The method as recited in claim 9 wherein in addition to the data of the star sensor, synchronous rate measuring data from a gyroscope are used and transformed into rates in the uniform reference system.

11. The method as recited in claim 9 wherein the reduction of the errors and of the error correlation is implemented as rate integration and maximum likelihood fit between integrated rates and the transformed data of the star sensor.

12. The method as recited in claim 9 wherein the cross-calibration is carried out in the form of low pass filtering and conversion to rate-dependent bias values, with subsequent separation from the bias and the scaling factor of the gyroscope sensor.

13. The method as recited in claim 9 wherein in the event of malfunction of the star sensors, the non-nominal processor uses the values estimated in separation of the bias and the scaling factor to determine the non-nominal positions and rates solely from the rates in the uniform reference system.

14. The method as recited in claim 9 wherein the trend identification is carried out in the form of an estimation of the torsion axis of the satellite and an estimation of a delta rotation matrix of the distortion, and updating of the trend of the transformation parameters takes place by applying the delta rotation.

* * * * *